(12) United States Patent
 Mills et al.

(10) Patent No.: US 8,869,022 B1
(45) Date of Patent: Oct. 21, 2014

(54) VISUAL ANNOTATIONS AND SPATIAL MAPS FOR FACILITATING APPLICATION USE

(75) Inventors: Michael I Mills, Mountain View, CA (US); Anthony Creed, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 431 days.

(21) Appl. No.: 12/820,484

(22) Filed: Jun. 22, 2010

(51) Int. Cl.
 *G06F 3/048* (2013.01)
(52) U.S. Cl.
 USPC ............................ 715/230; 715/232; 715/855
(58) Field of Classification Search
 None
 See application file for complete search history.

(56) References Cited

U.S. PATENT DOCUMENTS

| 2004/0049534 A1* | 3/2004 | Nickerson et al. ............ 709/203 |
| 2010/0070842 A1* | 3/2010 | Aymeloglu et al. ........... 715/207 |
| 2011/0238768 A1* | 9/2011 | Habets et al. ................. 709/206 |

* cited by examiner

*Primary Examiner* — Stephen Hong
*Assistant Examiner* — Asher Kells
(74) *Attorney, Agent, or Firm* — Park, Vaughan, Fleming & Dowler LLP; Chia-Hsin Suen

(57) ABSTRACT

The disclosed embodiments provide a system that facilitates use of an application. During operation, the system obtains a visual annotation of a user interface for the application, in which the visual annotation corresponds to a user issue with the user interface. Next, the system uses the visual annotation to update a spatial map of user issues with the user interface. Finally, the system uses the visual annotation and the spatial map to facilitate use of the application by an end user.

18 Claims, 7 Drawing Sheets

VISUAL ANNOTATIONS AND SPATIAL MAPS FOR FACILITATING APPLICATION USE

BACKGROUND

Related Art

The present embodiments relate to techniques for facilitating use of an application.

Application software may be used to perform tasks of varying duration and complexity. Furthermore, different amounts of user input and/or interaction with the software may be required to complete the tasks. For example, a user may spend several hours entering information into a tax preparation application to prepare and file his/her taxes, several minutes on an email client to send and receive emails, and/or several seconds starting and setting up a media player to play music. User experiences with an application may also vary based on the application's complexity, the user's familiarity with the application, and/or the domain of the application. For example, an accountant may find a tax preparation application to be simple or straightforward to use, while a user unfamiliar with tax law may find the same tax preparation application to be unusable.

Intelligent user interface design may facilitate interaction between an application and users of varying ability levels. For example, complex applications may include tutorials that explain the use of various features in the applications to the user. Use of help and/or support features may also improve a user's understanding of an application's user interface. For example, a user may browse or search an index of help topics to understand a confusing feature and/or part of an application. The user may also post questions on online forums to obtain support from customer care specialists and/or more advanced users of the application. Finally, user issues with the user interface of an application may be identified and used to improve the user interface. For example, questions posted on online forums and/or other user feedback may be used by designers or architects to determine problematic areas with an application's user interface and modify the user interface accordingly.

Hence, positive user experiences with applications may be aided by identifying user issues with applications and providing support mechanisms that efficiently and effectively resolve the user issues.

SUMMARY

The disclosed embodiments provide a system that facilitates use of an application. During operation, the system obtains a visual annotation of a user interface for the application, in which the visual annotation corresponds to a user issue with the user interface. Next, the system uses the visual annotation to update a spatial map of user issues with the user interface. Finally, the system uses the visual annotation and the spatial map to facilitate use of the application by an end user.

In some embodiments, the system also stores the visual annotation in an annotation repository.

In some embodiments, the visual annotation includes a screenshot of the user interface, a user comment associated with the screenshot, and graphical markup of a user-interface element in the screenshot.

In some embodiments, using the visual annotation to update the spatial map of user issues involves at least one of increasing an issue density of a region of the spatial map based on the screenshot and the graphical markup, and enabling access to the visual annotation from the spatial map.

In some embodiments, the spatial map is at least one of a site map of the application, a navigation flow diagram of the user interface, and the screenshot.

In some embodiments, the visual annotation is obtained from the end user without requiring the end user to navigate away from the user-interface element.

In some embodiments, using the visual annotation and the spatial map to facilitate use of the application involves providing the visual annotation and the spatial map to a technical user, and enabling communication between the technical user and the end user.

In some embodiments, communication between the technical user and the end user involves at least one of a response to the user issue from the technical user, and a live chat between the technical user and the end user.

BRIEF DESCRIPTION OF THE FIGURES

In the figures, like reference numerals refer to the same figure elements.

DETAILED DESCRIPTION

Figure 1:
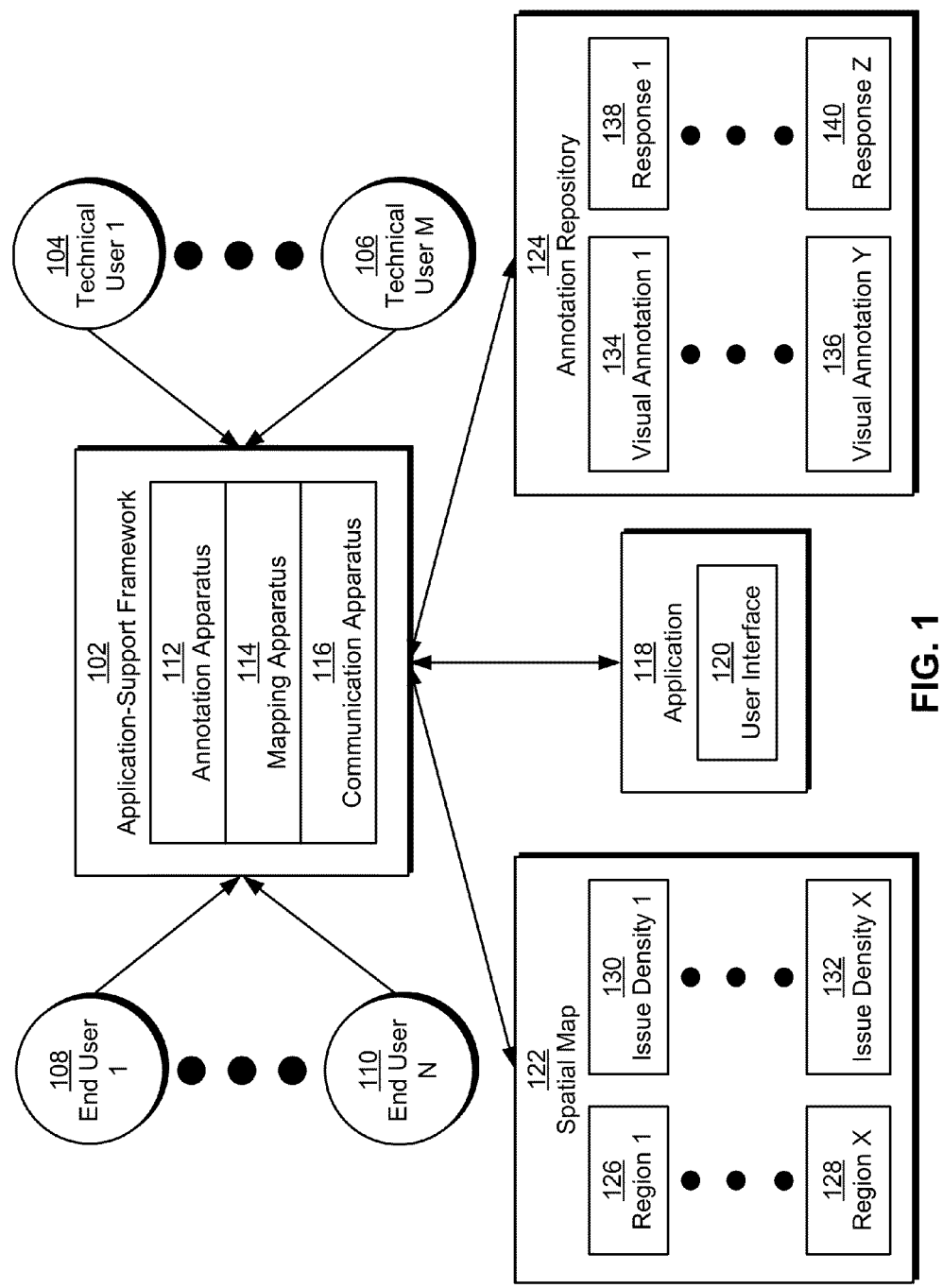
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating use of an application. The application may correspond to application software such as a word processor, an email client, a web browser, a web application, and/or a tax preparation application. The application may be used to perform one or more tasks for an end user of the application. For example, the application may allow the end user to create documents, display web pages, and/or prepare tax forms. Moreover, the end user may interact with the application through the application's user interface.

More specifically, embodiments provide a method and system for obtaining visual annotations of the user interface from end users of the application. Each visual annotation may correspond to a user issue with the user interface. Moreover, the visual annotation may be obtained without requiring the end user to navigate away from the user-interface element. The visual annotation may include a screenshot of the user interface, a user comment associated with the screenshot, and/or graphical markup of a user-interface element in the screenshot. As a result, an end user may use the visual annotation to graphically depict a confusing and/or problematic part of the user interface.

The visual annotation may then be used to update a spatial map of user issues with the user interface. The spatial map may include a site map of the application, a navigation flow diagram of the user interface, and/or the screenshot. The spatial map may be updated by increasing an issue density of a region of the spatial map based on the screenshot and the graphical markup, and/or enabling access to the visual annotation from the spatial map.

The visual annotation and the spatial map may also be used to facilitate use of the application. In particular, the visual annotation and the spatial map may be provided to a technical user, and communication between the technical user and the end user may be enabled. Because the visual annotation includes graphical markup, the visual annotation may better convey the user issue than a purely text-based description of the user issue from the end user. The visual annotation and spatial map may also be used by the technical user to modify the user interface. For example, user-interface elements that are frequently associated with user issues may be modified to improve the usability and design of the application.

FIG. 1 shows a schematic of a system in accordance with an embodiment. In one or more embodiments, the system corresponds to an application-support framework 102 that may be accessed by a set of technical users (e.g., technical user 1 104, technical user m 106) and a set of end users (e.g., end user 1 108, end user n 110). Application-support framework 102 includes an annotation apparatus 112, a mapping apparatus 114, and a communication apparatus 116. Each of these components is described in further detail below.

In one or more embodiments, application-support framework 102 facilitates use of an application 118 by the end users (e.g., end user 1 108, end user n 110) through collaboration and/or input from the technical users (e.g., technical user 1 104, technical user m 106). Application 118 may correspond to a software program that is executed by a computing device, such as a personal computer (PC), laptop computer, mobile phone, portable media player, and/or server computer. For example, application 118 may be a word-processing application, an email client, an operating system, an accounting application, and/or a web browser. Application 118 may be distributed across one or more machines and accessed in various ways. For example, application 118 may be installed on a personal computer (PC) and executed through an operating system on the PC. Alternatively, application 118 may run on one or more servers and provide services to the user through a web browser and network connection. Regardless of the method of access, interaction between application 118 and the end users may be facilitated through a user interface 120.

In particular, input/output (I/O) between the end users and application 118 is enabled by user interface 120. For example, the end users may provide input (e.g., mouse clicks, keyboard presses, file uploads, gestures, etc.) to application 118 through a graphical user interface (GUI) provided by application 118 and view text, images, documents, menus, icons, form fields, and/or other elements of application 118 through the same GUI. Those skilled in the art will appreciate that other types of user interfaces, such as command line interfaces and/or web-based user interfaces, may also be used by application 118. Thus, application 118 is able to perform tasks by receiving input from and providing output to the end users through user interface 120.

Those skilled in the art will appreciate that an end user's overall experience with application 118 may be affected by factors such as the end user's familiarity with application 118, the end user's knowledge of the domain of application 118, and/or the complexity of application 118. For example, the end user may find a web browser to be easy or straightforward to use and an accounting application difficult or confusing to use. On the other hand, an accountant may have greater ease in using an accounting application than an end user who is unfamiliar with accounting principles or mechanisms.

To facilitate use of application 118 by end users of different skill levels and backgrounds, application-support framework 102 may allow the technical users to provide customer support and/or technical advice to the end users. For example, communication apparatus 116 may provide an online forum that allows the end users to post questions or comments regarding features and/or user-interface elements in an accounting application. The technical users may correspond to accountants or technical support employees who assist the end users by responding to the posts and/or participating in live chats with the end users.

In one or more embodiments, application-support framework 102 allows end users to graphically depict and describe user issues with user interface 120. In particular, annotation apparatus 112 may obtain visual annotations (e.g., visual annotation 1 134, visual annotation y 136) of user interface 120 from the end users and store the visual annotations in an annotation repository 124 for subsequent retrieval and use. Each visual annotation may correspond to a user issue with user interface 120 and may include a screenshot of the user interface, a user comment associated with the screenshot, and/or graphical markup of a user-interface element in the screenshot. For example, an end user may create a visual annotation containing graphical markup of a form field in user interface 120 because the end user is unsure of the purpose of the form field.

In addition, the visual annotation may be obtained from the end user without requiring the end user to navigate away from the user-interface element. In other words, the visual annotation may be obtained in a way that does not interfere with the end user's workflow through application 118. For example, annotation apparatus 112 may include a plugin, feature, and/or widget in application 118 that allows the end user to take a screenshot of user interface 120, type in a comment, and/or use drawing tools to mark up the screenshot without navigating to a different part of application 118. Annotation apparatus 112 is described in further detail below with respect to FIGS. 2A-2C.

Next, mapping apparatus 114 may use the visual annotation to update a spatial map 122 of user issues with application 118. As shown in FIG. 1, spatial map 122 includes a set of regions (e.g., region 1 126, region x 128). Each region may represent a part of application 118 and/or user interface 120. For example, spatial map 122 may correspond to a site map of application 118 and/or a navigation flow diagram of user interface 120. Regions in spatial map 122 may thus represent one or more user-interface elements, screens, features, and/or other portions of user interface 120.

In addition, each region in spatial map 122 may be associated with an issue density (e.g., issue density 1 130, issue density x 132). In one or more embodiments, the issue density of a region in spatial map 122 is proportional to the number or frequency of user issues associated with the region. For example, a feature of application 118 may have a high issue density if a large number of end users report user issues with the feature and a low issue density if few to no end users have user issues with the feature. Alternatively, the issue density may correspond to the severity of the user issues, the amount of effort required to correct the user issues, and/or other attributes associated with the user issues.

As a result, the screenshot and the graphical markup from a visual annotation may be used to increase the issue density of a region in spatial map 122. For example, a visual annotation may include graphical markup from a drawing tool that encircles or points to a form field in user interface 120. Mapping apparatus 114 may identify the form field from the graphical markup and increase the issue density of a region of spatial map 122 containing the form field. Mapping apparatus 114 may also enable access to the visual annotation from spatial map 122. For example, mapping apparatus 114 may add a pushpin element that references and/or links to the visual annotation from the corresponding region in spatial map 122. Spatial map 122 is discussed in further detail below with respect to FIG. 3.

Finally, communication apparatus 116 may use the visual annotations from annotation repository 124 and spatial map 122 to facilitate use of the application by the end users. First, communication apparatus 116 may provide the visual annotations and spatial map 122 to the technical users. For example, communication apparatus 116 may display the visual annotations and spatial map 122 to the technical users through user interface 120 and/or another GUI associated with application-support framework 102.

Next, communication apparatus 116 may enable communication between a technical user and an end user. The communication may include a response (e.g., response 1 138, response z 140) to a user issue associated with the end user. For example, the response may answer a question in a visual annotation regarding the purpose of a user-interface element in user interface 120. The technical user may also participate in a live chat and/or a phone call with the end user. For example, the technical user may use a live chat that includes a view of the end user's user interface 120 to discuss the carrying out of certain tasks using application 118 with the end user.

Consequently, application-support framework 102 may allow the technical users to better understand user issues with application 118, which in turn may facilitate use of the application by the end users. In particular, visual annotations from the end users may allow the end users to graphically pinpoint problematic and/or confusing parts of user interface 120, thus improving the end users' ability to express user issues with user interface 120. Moreover, mechanisms for obtaining the visual annotations without disrupting the end users' workflows within application 118 may reduce the complexity and difficulty associated with obtaining customer support for application 118. Finally, spatial map 122 may allow the technical users to assess the overall usability and/or design of user interface 120, identify parts of user interface 120 that commonly trigger user issues, and view and access user issues within a spatial layout of application 118 and/or user interface 120.

Figure 2A:
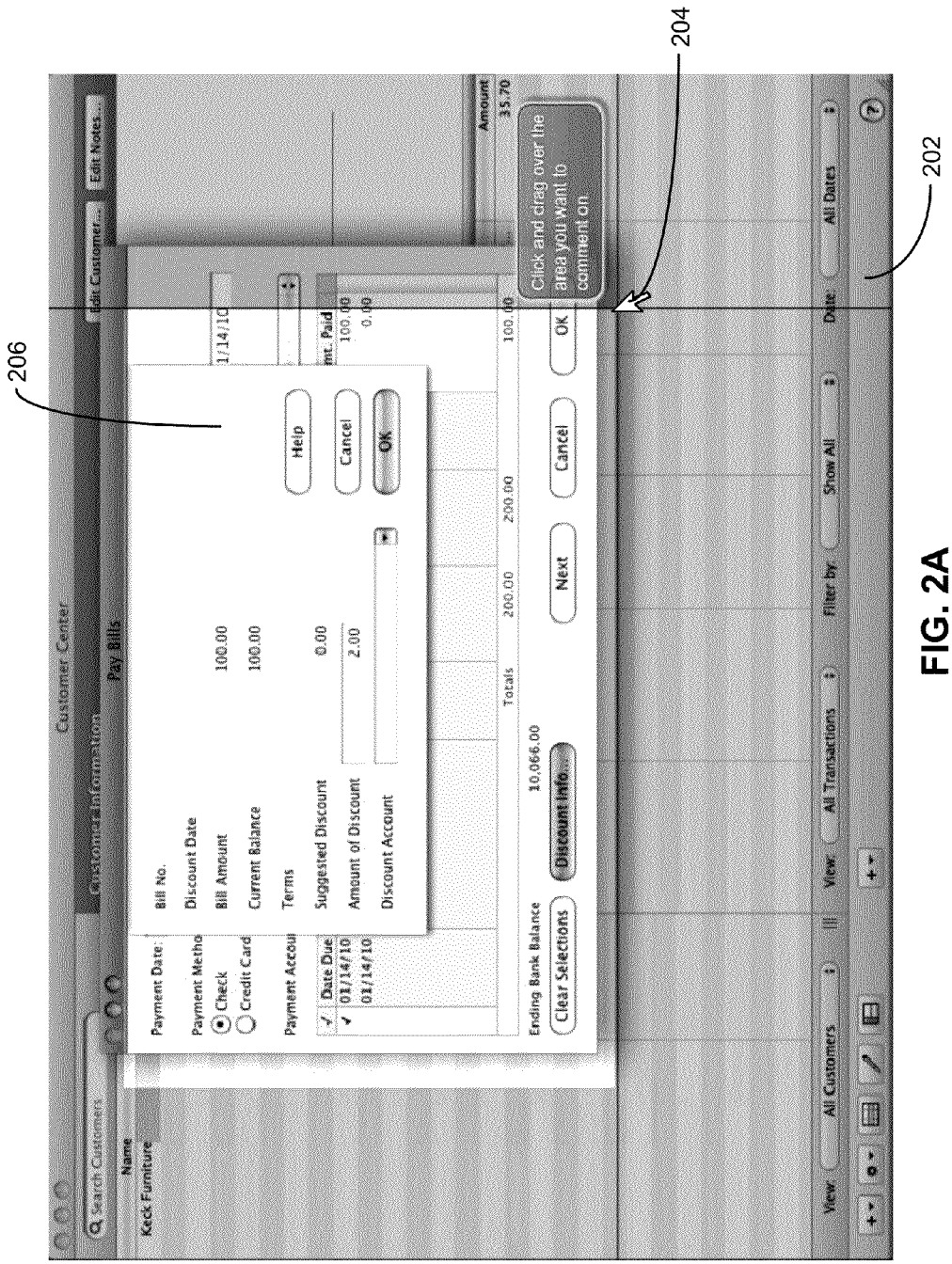
FIG. 2A shows an exemplary use of an annotation apparatus in accordance with an embodiment.

FIG. 2A shows an exemplary use of an annotation apparatus in accordance with an embodiment. More specifically, FIG. 2A shows a screenshot of an annotation apparatus, such as annotation apparatus 112 of FIG. 1. As discussed above, the annotation apparatus may allow an end user to provide a screenshot 206 of a user interface 202 for an application, such as a GUI or web-based user interface.

In addition, screenshot 206 may be obtained without requiring the end user to interrupt his/her workflow within the application. As a result, the functionality of the annotation apparatus may be overlaid on user interface 202. For example, the end user may access the annotation apparatus from user interface 202 by selecting a button, providing a keyboard shortcut, and/or using another input mechanism associated with user interface 202.

Once the functionality of the annotation apparatus is enabled, a pointer 204 in user interface 202 may be used to obtain screenshot 206 for use in a visual annotation of user interface 202. For example, the end user may click and drag pointer 204 using a mouse, touchpad, and/or other input device to select a region of user interface 202 for inclusion in screenshot 206. To assist the end user with selecting screenshot 206, a set of crosshairs intersecting at pointer 204 may be displayed, and the unselected portion of user interface 202 may be grayed out. In other words, screenshot 206 may contain some or all of a screen or window in user interface 202.

Figure 2B:
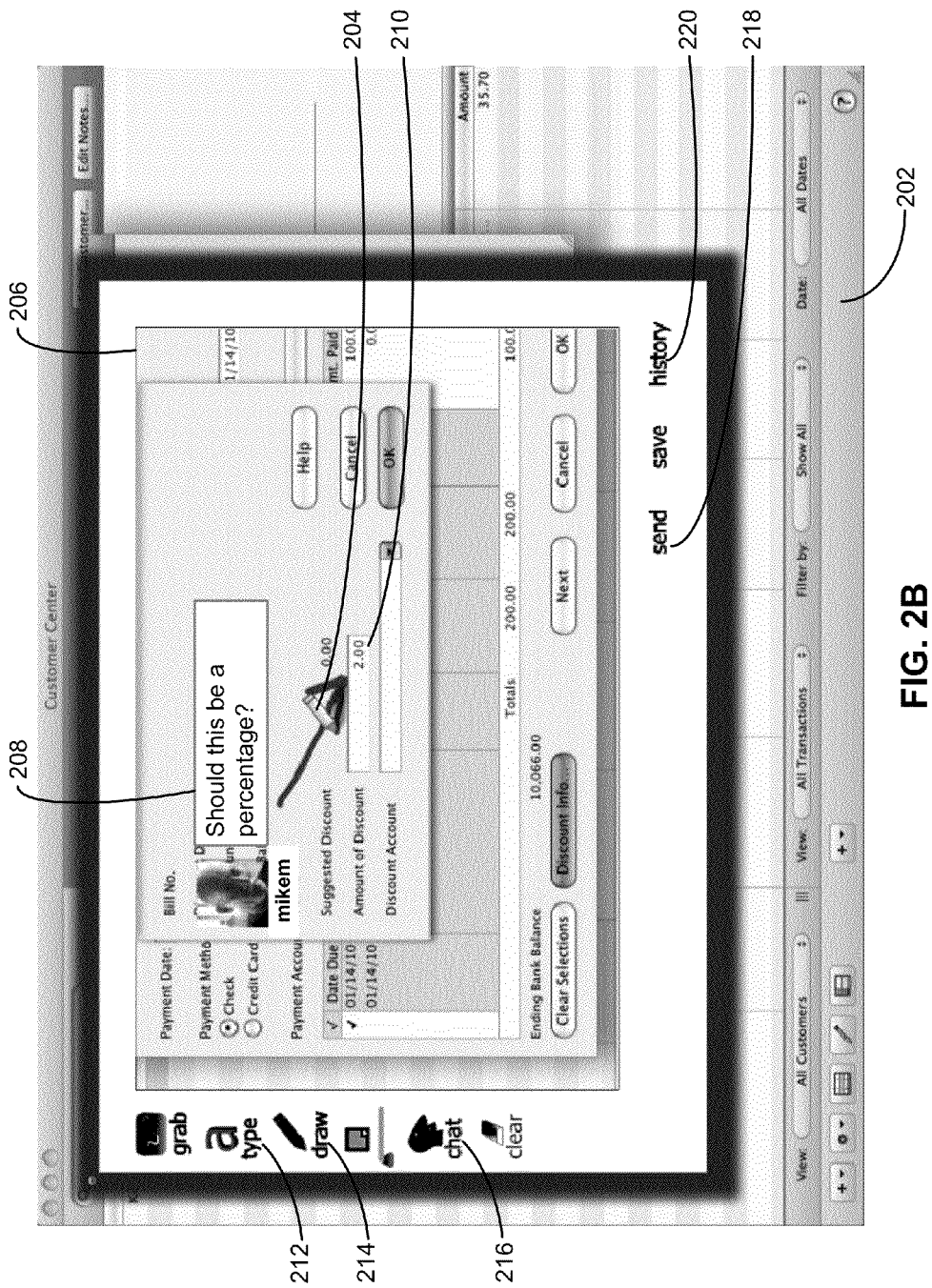
FIG. 2B shows an exemplary use of an annotation apparatus in accordance with an embodiment.

FIG. 2B shows an exemplary use of an annotation apparatus in accordance with an embodiment. FIG. 2B may show the annotation apparatus of FIG. 2A after the end user has selected screenshot 206 for use in the visual annotation. As shown in FIG. 2B, the annotation apparatus continues to be overlaid on user interface 202, thus allowing the end user to return to user interface 202 after creating the visual annotation. In other words, the visual annotation may be obtained from the end user without requiring the end user to navigate away from user interface 202.

In addition, the annotation apparatus includes a number of elements 212-220 associated with the creation and use of the visual annotation. First, element 212 may be selected by the end user to provide a user comment associated with screenshot 206. For example, the end user may select element 212 (e.g., "type") using a pointing device (e.g., mouse, touchpad, etc.) and/or keyboard shortcut to place an element 208 containing a picture associated with the end user, a login for the end user (e.g., "mikem"), and a form field on top of screenshot 206. The end user may then type the user comment (e.g., "Should this be a percentage?") into the form field using a keyboard. The user comment may thus correspond to a text-based description of a user issue with user interface 202.

The end user may also use element 214 (e.g., "draw") to graphically mark up screenshot 206. Once element 214 is selected, pointer 204 may turn into a drawing tool that allows the end user to provide graphical markup that indicates a user-interface element 210 associated with the user issue. For example, the end user may draw an arrow pointing to element 210 (e.g., a form field) to indicate element 210 as the target of the user comment in element 208. Alternatively, the end user may draw a circle around element 210, highlight element 210, and/or otherwise indicate element 210 as the focus of the visual annotation.

After using elements 212-214, the end user may select element 218 (e.g., "send") to submit screenshot 206, the user comment in element 208, and graphical markup from pointer 204 as the visual annotation of user interface 202. The visual annotation may then be stored in an annotation repository, such as annotation repository 124 of FIG. 1, and used to update a spatial map of user issues with the application. The visual annotation may also be viewed by a technical user such as a customer support representative and/or an experienced user of the application.

The end user may also select element 216 (e.g., "chat") to participate in a live chat with the technical user. For example, the end user may activate the live chat after submitting the visual annotation, or the end user may use the live chat to obtain assistance with creating the visual annotation. The live chat may additionally be associated with a variety of capabilities. For example, the live chat may include instant messaging functionality, voice call functionality, and/or desktop-sharing functionality between the end user and the technical user.

Finally, the end user may select element 220 (e.g., "history") to view a list of the end user's submitted visual annotations over time. The list may be sorted by date, subject matter, and/or the availability of responses to the visual annotations. The list may allow the end user to view the visual annotations and available responses and/or obtain additional assistance with using the user-interface elements associated with the visual annotations. For example, each element in the list may include a link to the corresponding visual annotation. The end user may select an element from the list to access the corresponding visual annotation, view available responses (e.g., from technical users) to the visual annotation, and/or request a response if one is yet to be made.

Figure 2C:
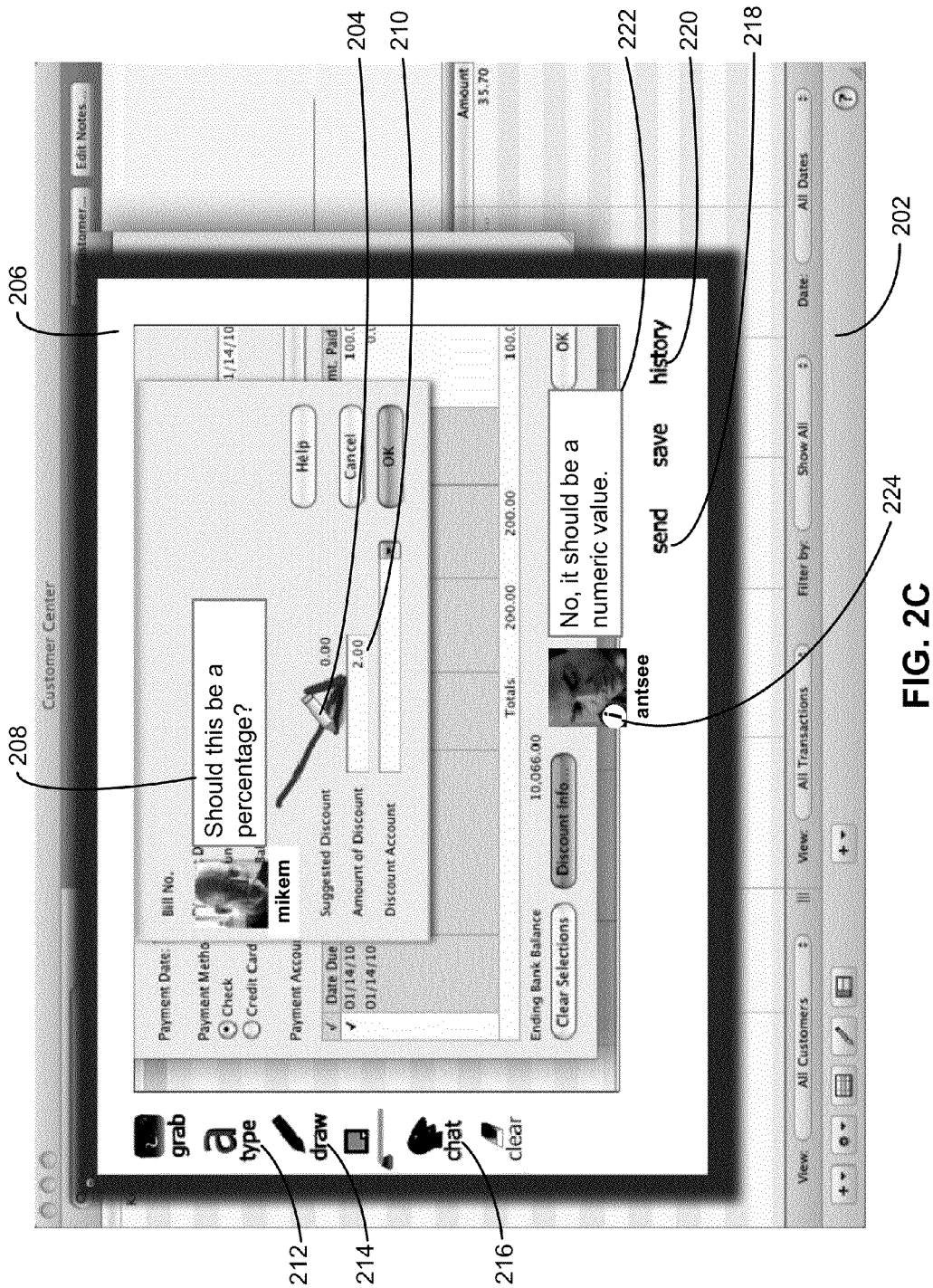
FIG. 2C shows an exemplary use of an annotation apparatus in accordance with an embodiment.

FIG. 2C shows an exemplary use of an annotation apparatus in accordance with an embodiment. In particular, FIG. 2C shows the annotation apparatus of FIG. 2B after the end user selects element 218 and submits the visual annotation. As shown in FIG. 2C, an element 222 containing a response (e.g., "No, it should be a numeric value.") to the visual annotation is displayed.

The response may be generated by a technical user after receiving the visual annotation from a communication apparatus, such as communication apparatus 116 of FIG. 1. The communication apparatus may also facilitate the display of the response within the annotation apparatus. In other words, the communication apparatus may include functionality to enable communication between the end user and the technical user over a network. As a result, the live chat functionality associated with element 216 may also be provided by the communication apparatus.

Like element 208, element 222 also includes a picture associated with the technical user and a login (e.g., "antsee") for the technical user. The end user may select a link 224 to view additional information associated with the technical user. For example, link 224 may allow the end user to view a pop-up containing credentials (e.g., "Consultant," "Accountant," etc.) for the technical user and/or a rating (e.g., point score, letter grade, etc.) for the technical user. In other words, link 224 may assist the end user with determining the quality of the response in element 222.

After receiving the response, the end user may return to user interface 202 and continue with his/her workflow within the application. For example, the end user may fill in user-interface element 210 based on the response (e.g., with a numeric value) in element 222. On the other hand, the end user may request clarification from the technical user and/or other technical users if the user issue with user-interface element 210 remains unresolved. For example, the end user may select element 216 to engage in a live chat and/or voice call with the technical user to obtain additional information regarding user-interface element 210 from the technical user, or the end user may request a response to the visual annotation from a different technical user.

Figure 3:
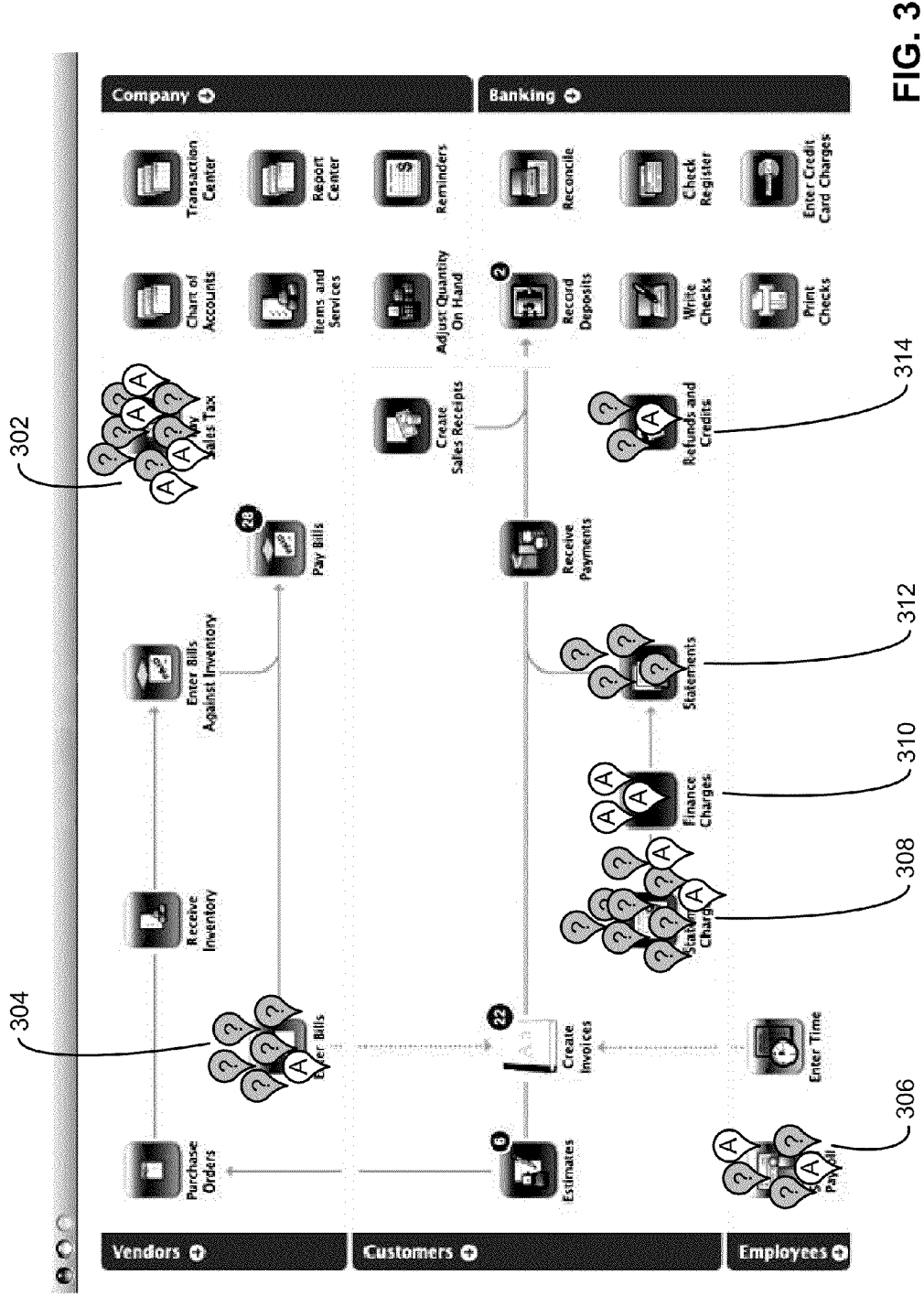
FIG. 3 shows an exemplary spatial map of user issues with a user interface in accordance with an embodiment.

FIG. 3 shows an exemplary spatial map of user issues with a user interface in accordance with an embodiment. The spatial map may correspond to a navigation flow diagram of the user interface for an application, such as an accounting application. Moreover, the spatial map contains a number of regions 302-314 associated with the user issues. Each region 302-314 contains a number of pushpins; pushpins labeled with a question mark may represent visual annotations and/or user issues, while pushpins labeled with an "A" may represent responses to the visual annotations. As a result, the issue density of a region may be proportional to the number of pushpins with question marks in the region. For example, the issue density of region 314 may be lower than the issue density of region 304 because region 314 contains two visual annotations while region 304 contains five visual annotations.

The pushpins may also enable access to the corresponding visual annotations and/or responses. For example, a pushpin may include a link that may be selected to view the corresponding visual annotation and/or response in a pop-up and/or separate window. Different views of the spatial map may also be available. For example, the spatial map may be associated with different zoom levels; the lowest zoom level may correspond to a site map of the application, while the highest zoom level may correspond to an individual screen in the application's user interface. Different zoom levels may also contain different types of regions. For example, a spatial map of a screen may be divided into regions representing user-interface elements within the screen. User issues associated with the screen may thus be represented by pushpins that are clustered at or around the user-interface elements.

Similarly, the spatial map may represent issue densities in various ways. For example, an issue density of a region may be depicted using a color, with red representing a high issue density (e.g., many visual annotations and/or user issues) and blue representing a low issue density (e.g., few to no visual annotations and/or user issues). Along the same lines, each region's issue density may be indicated by displaying the number of user issues associated with the region next to the region in the spatial map. Moreover, user issues may be flagged if the issue density of the corresponding region(s) exceeds a preset threshold.

As mentioned previously, the issue density of a region may be based on other characteristics. For example, the issue density may be proportional to the severity of user issues, the amount of effort required to fix the user issues, and/or other attributes associated with the user issues. Consequently, the spatial map may also include different views of user issues based on one or more attributes associated with the user issues. For example, pushpins labeled with question marks may be color-coded to represent the severity of the corresponding user issues, with red representing urgent or severe user issues (e.g., program crashes, major bugs, etc.), yellow representing user issues of moderate severity (e.g., inability to understand major features), and green representing minor user issues (e.g., use of minor or obscure features).

The spatial map may thus assist a technical user with customer support by allowing the technical user to assess the overall usability and/or design of the user interface, identify parts of the user interface that commonly trigger user issues, and/or view and access user issues within a spatial layout of the user interface. For example, the technical user may modify region 308 to reduce the number of user issues with user-interface elements in region 308. The technical user may also prioritize responses to visual annotations in region 304 because of the lack of responses to visual annotations in region 304. In other words, the spatial map may provide an interactive tool that facilitates the assessment, viewing, and prioritization of user issues with the user interface.

Figure 4:
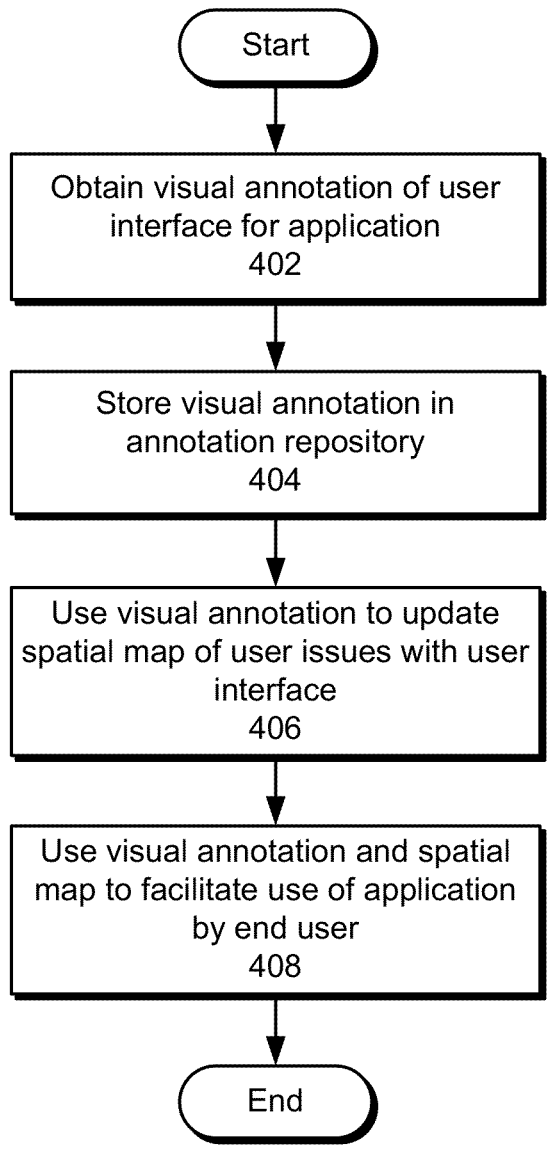
FIG. 4 shows a flowchart illustrating the process of facilitating use of an application in accordance with an embodiment.

FIG. 4 shows a flowchart illustrating the process of facilitating use of an application in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, a visual annotation of a user interface for an application is obtained (operation 402). The visual annotation may correspond to a user issue with the user interface. For example, the visual annotation may be created by an end user to communicate a question or a problem with a user-interface element in the user interface. In addition, the visual annotation may be obtained without requiring the end user to navigate away from the user-interface element. For example, the visual annotation may be obtained using tools that are overlaid on the user interface. To facilitate communication of the user issue, the visual annotation may include a screenshot of the user interface, a user comment associated with the screenshot, and/or graphical markup of a user-interface element in the screenshot. As a result, the visual annotation may be more effective at conveying the user's problem or question than a text-based communication mechanism such as an online forum or feedback form.

Next, the visual annotation is stored in an annotation repository (operation 404) for subsequent use and retrieval. For example, the visual annotation may be stored in a database with other visual annotations of the user interface. The visual annotation may also be used to update a spatial map of user issues with the user interface (operation 406). In particular, the issue density of a region of the spatial map may be increased based on the screenshot and the graphical markup, and access to the visual annotation from the spatial map (e.g., through a pushpin or link) may be enabled.

Finally, the visual annotation and the spatial map are used to facilitate use of the application by the end user (operation 408). The visual annotation and the spatial map may be provided to a technical user, and communication between the technical user and the end user may be enabled. In other words, the visual annotation and spatial map may allow the technical user to identify the end user's user issue with the user interface. The technical user may then assist the end user with using the application by providing a targeted response to the user issue and/or participating in a live chat with the end user. The spatial map may further allow the technical user to assess the overall usability and/or design of the application and modify confusing and/or problematic areas of the application accordingly.

Figure 5:
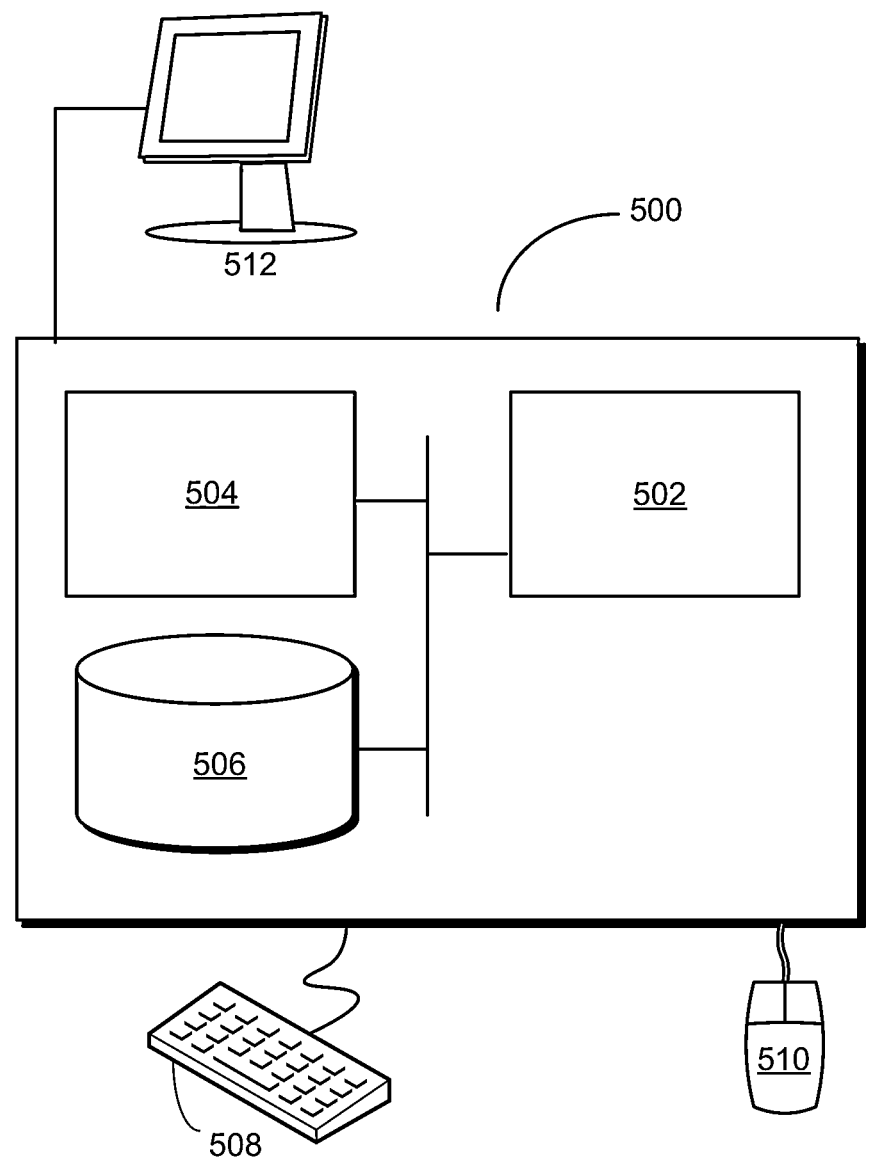
FIG. 5 shows a computer system in accordance with an embodiment.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating use of an application. The system may include an annotation apparatus that obtains a visual annotation of a user interface for the application. The visual annotation may correspond to a user issue with the user interface and may include a screenshot of the user interface, a user comment associated with the screenshot, and/or graphical markup of a user-interface element in the screenshot. The annotation apparatus may also store the visual annotation in an annotation repository.

The system may also include a mapping apparatus that uses the visual annotation to update a spatial map of user issues with the user interface. The spatial map may include a site map of the application, a navigation flow diagram of the user interface, and/or the screenshot. Finally, the system may include a communication apparatus that uses the visual annotation and the spatial map to facilitate use of the application by an end user.

In addition, one or more components of computer system 500 may be remotely located and connected to the other components over a network. Portions of the present embodiments (e.g., annotation apparatus, mapping apparatus, communication apparatus, etc.) may also be located on different nodes of a distributed system that implements the embodiments. For example, the present embodiments may be implemented using a cloud computing system that provides customer support to end users of an application.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for facilitating use of an application, comprising:
    an annotation apparatus configured to obtain a visual annotation of a user interface for the application, wherein the visual annotation corresponds to a user issue with the user interface;
    a mapping apparatus configured to use the visual annotation to update a spatial map of user issues with the user interface by increasing an issue density of a region of the spatial map based on a screenshot of the user interface and the visual annotation, wherein the visual annotation comprises:

a user comment associated with the screenshot, and a graphical markup of a user-interface element in the screenshot;

wherein the mapping apparatus is further configured to update the spatial map so that the spatial map illustrates issue densities for specific regions in a navigation flow diagram of the user interface; and a communication apparatus configured to use the visual annotation and the spatial map to facilitate use of the application by an end user.

2. The system of claim 1, wherein the annotation apparatus is further configured to:

store the visual annotation in an annotation repository.

3. The system of claim 1, wherein using the visual annotation to update the spatial map of user issues involves enabling access to the visual annotation from the spatial map.

4. The system of claim 3, wherein the spatial map is at least one of:

a site map of the application;

a navigation flow diagram of the user interface; and the screenshot.

5. The system of claim 1, wherein the visual annotation is obtained from the end user without requiring the end user to navigate away from the user-interface element.

6. The system of claim 1, wherein the communication apparatus facilitates use of the application by the end user by:

providing the visual annotation and the spatial map to a technical user; and enabling communication between the technical user and the end user.

7. A computer-implemented method for facilitating use of an application, comprising:

obtaining a visual annotation of a user interface for the application, wherein the visual annotation corresponds to a user issue with the user interface;

using the visual annotation to update a spatial map of user issues with the user interface by increasing an issue density of a region of the spatial map based on a screenshot of the user interface and the visual annotation, wherein the visual annotation comprises:

a user comment associated with the screenshot, and a graphical markup of a user-interface element in the screenshot;

updating the spatial map so that the spatial map illustrates issue densities for specific regions in a navigation flow diagram of the user interface; and using the visual annotation and the spatial map to facilitate use of the application by an end user.

8. The computer-implemented method of claim 7, further comprising:

storing the visual annotation in an annotation repository.

9. The computer-implemented method of claim 7, wherein using the visual annotation to update the spatial map of user issues involves enabling access to the visual annotation from the spatial map.

10. The computer-implemented method of claim 9, wherein the spatial map is at least one of:

a site map of the application;

a navigation flow diagram of the user interface; and the screenshot.

11. The computer-implemented method of claim 7, wherein the visual annotation is obtained from the end user without requiring the end user to navigate away from the user-interface element.

12. The computer-implemented method of claim 7, wherein using the visual annotation and the spatial map to facilitate use of the application involves:

providing the visual annotation and the spatial map to a technical user; and enabling communication between the technical user and the end user.

13. A non-transitory computer-readable storage medium storing instructions that when executed by a computer cause the computer to perform a method for facilitating use of an application, the method comprising:

obtaining a visual annotation of a user interface for the application, wherein the visual annotation corresponds to a user issue with the user interface;

using the visual annotation to update a spatial map of user issues with the user interface by increasing an issue density of a region of the spatial map based on a screenshot of the user interface and the visual annotation, wherein the visual annotation comprises:

a user comment associated with the screenshot, and a graphical markup of a user-interface element in the screenshot;

updating the spatial map so that the spatial map illustrates issue densities for specific regions in a navigation flow diagram of the user interface; and using the visual annotation and the spatial map to facilitate use of the application by an end user.

14. The non-transitory computer-readable storage medium of claim 13, the method further comprising:

storing the visual annotation in an annotation repository.

15. The non-transitory computer-readable storage medium of claim 13, wherein using the visual annotation to update the spatial map of user issues involves enabling access to the visual annotation from the spatial map.

16. The non-transitory computer-readable storage medium of claim 15, wherein the spatial map is at least one of:

a site map of the application;

a navigation flow diagram of the user interface; and the screenshot.

17. The non-transitory computer-readable storage medium of claim 13, wherein the visual annotation is obtained from the end user without requiring the end user to navigate away from the user-interface element.

18. The non-transitory computer-readable storage medium of claim 13, wherein using the visual annotation and the spatial map to facilitate use of the application involves:

providing the visual annotation and the spatial map to a technical user; and enabling communication between the technical user and the end user.

* * * * *